United States Patent [19]
Hahn et al.

[11] Patent Number: 5,568,906
[45] Date of Patent: Oct. 29, 1996

[54] FASTENING DEVICE FOR ROD-SHAPED ARTICLES

[75] Inventors: Ernst-Ludwig Hahn, Rabenau; Harald Schaty, Wetzlar, both of Germany

[73] Assignee: Emhart Inc., Newark, Del.

[21] Appl. No.: 421,117

[22] Filed: Apr. 13, 1995

[30] Foreign Application Priority Data

Apr. 13, 1994 [DE] Germany .............................. 9406076 U

[51] Int. Cl.$^6$ ........................................................ F16L 3/08
[52] U.S. Cl. ................ 248/74.1; 248/74.4; 248/229.13; 248/229.14; 248/316.5; 248/316.6
[58] Field of Search ......................... 248/73, 74.2, 74.4, 248/229.13, 229.14, 229.23, 229.24, 316.5, 316.6

[56] References Cited

U.S. PATENT DOCUMENTS

| | | | |
|---|---|---|---|
| 4,881,705 | 11/1989 | Kraus | 248/74.2 |
| 5,184,794 | 2/1993 | Saito | 248/316.5 |
| 5,257,768 | 11/1993 | Juenemann et al. | 248/74.2 |

Primary Examiner—Ramon O. Ramirez
Assistant Examiner—Michael J. Turgeon
Attorney, Agent, or Firm—E. Murphy

[57] ABSTRACT

A fastening device is described with which rod-shaped articles of different diameters can be fastened on a substrate. The fastening device consists of a U-shaped base body in which a rod-shaped article can be arranged and which can be connected to the substrate, and of a beam-shaped closure member with which the arms of the "U" can be closed. One end of the beam-shaped closure member can be connected to the base body via a catch connection with teeth. At the other end of the beam-shaped closure member there is shaped a joint lug which forms a hinge-like joint with a joint pin shaped on the base body. The fastening of the article can be achieved after a rod-shaped article has been inserted into the base body by pivoting the closure member and engagement on the opposite end of the joint. Different diameter articles can be fastened on account of the teeth.

12 Claims, 3 Drawing Sheets

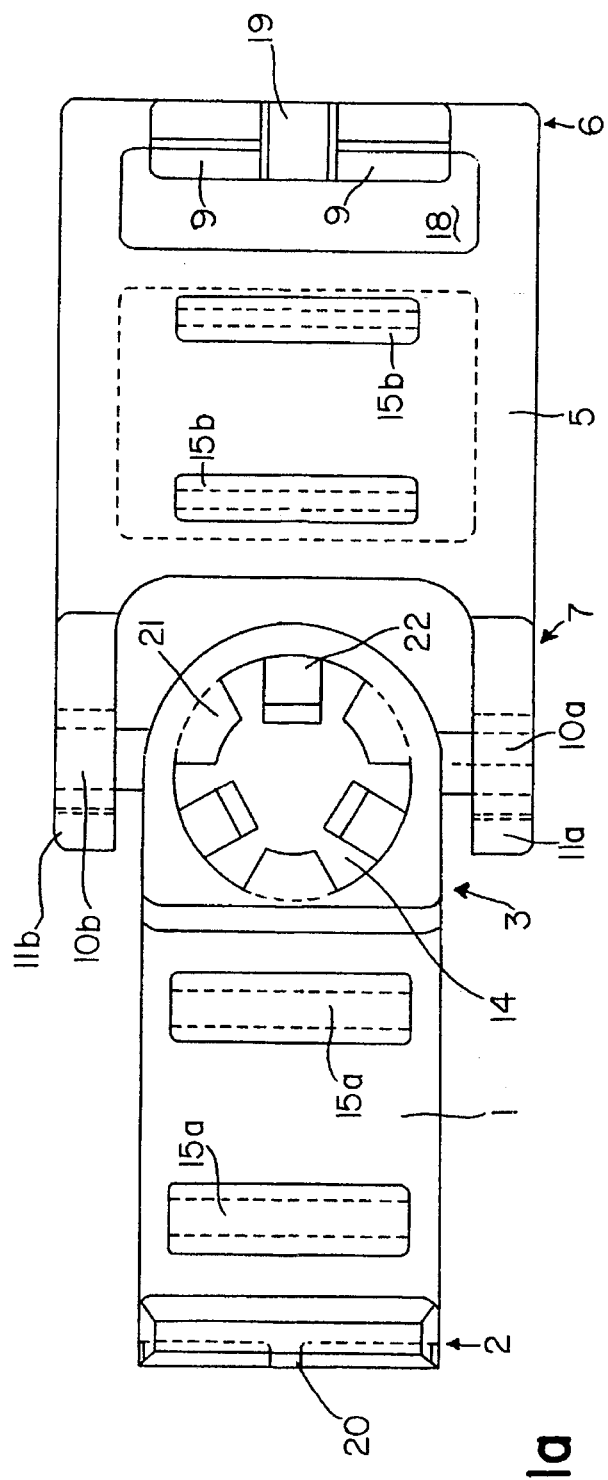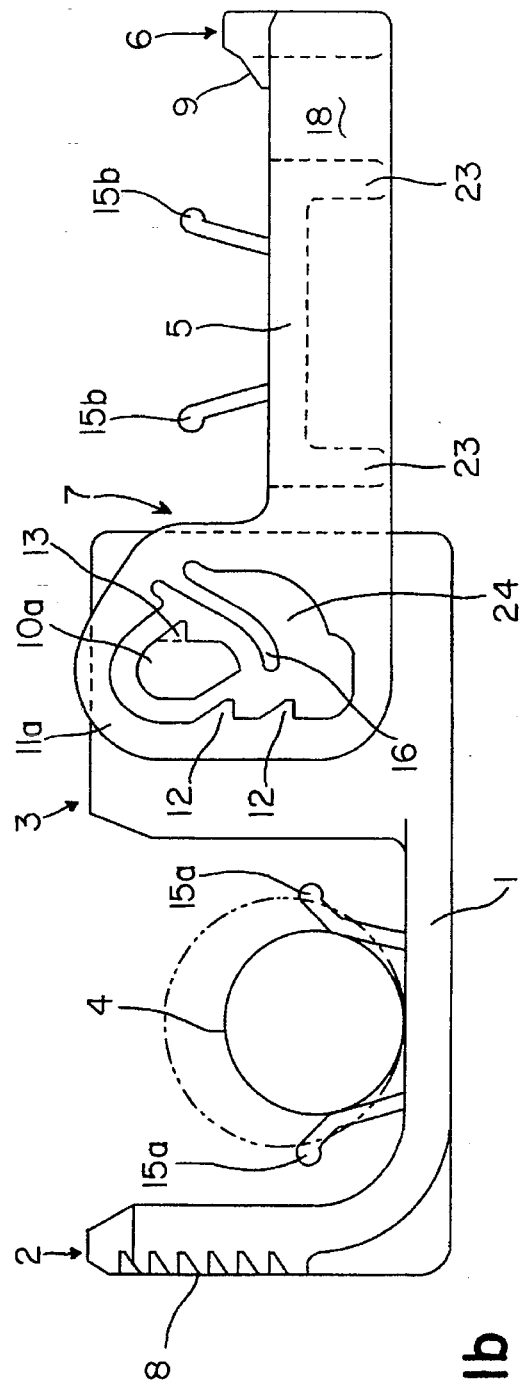
FIG. 1a
FIG. 1b 5,568,906

FASTENING DEVICE FOR ROD-SHAPED ARTICLES

BACKGROUND OF THE INVENTION

The invention relates to a fastening device, in particular of plastics injection molding material, which is suitable for rod-shaped articles, in particular tube-like conduits, of different diameters with a substantially U-shaped base body for receiving the rod-shaped article and a substantially beam-shaped closure member.

Fastening devices of this type are well known in the prior art. They can be essentially divided into one-part and two-part fastening devices.

With one-part devices, the closure member is articulated to one arm of the U-shaped base body. After insertion of an article into the base body, the closure member is pivoted into its closure position and is connected to the base body on the side opposite the joint. This is effected, for example, by a catch connection whereas the joint is typically a film hinge in the case of devices composed of plastics injection moldings. However, fastening devices of this type have the drawback that they are suitable only for articles with a predetermined peripheral cross section or that insert elements are required to enable articles with smaller peripheral cross sections to be fastened.

One example of a two-part fastening device is a fastening element for ribbon conductors. With such elements, teeth are provided on the two arms of the U-shaped base body to allow the fastening of different diameter cables. Appropriate catch noses are provided at both ends of the beam-shaped closure member. After insertion of a cable into the base body, the closure member is applied until the cable fits between the bottom of the base body and the closure member.

Fastening devices of this type have the drawback, however, that two different elements invariably have to be handled during installation, these elements having to be available in pairs during each procedure. However, this obstructs economic installation.

OBJECTS OF THE INVENTION

The object of the invention is to provide a fastening device which is suitable for rod-shaped articles having different peripheral cross sections and can be provided as a unit during installation.

BRIEF DESCRIPTION OF THE INVENTION

In one embodiment of the invention there is provided a fastening device having a base body and a closure member. The base body or the closure member, but preferably the base body, may be connected to a structure. Base body and closure member are connected via a hinge-like joint which simultaneously permits several parallel catch positions. A joint of this type is also called a catch joint in this application.

The catch joint consists of a joint pin and a joint lug forming an elongate joint eyelet. The internal cross section of the joint lug (the joint eyelet) is considerably greater than the cross section of the joint pin. Teeth are shaped on the internal wall of the joint lug and a correspondingly shaped catch nose is shaped on the joint pin. However, the joint pin can move substantially freely in the joint eyelet owing to the size thereof. When the closure element is located in a closed position relative to the base body, the catch nose can be brought into engagement with the teeth.

In a preferred embodiment of a device according to the invention, the base body is substantially U-shaped in configuration. The closure member is substantially beam-shaped in design and is connected to one arm of the "U" via a catch joint in such a way that the "U" can be closed and a fastening space limited on four sides is formed. Whereas the catch joint is located at one end of the closure member, a locking arrangement is provided at the opposite end with which the closure member can be locked to the arm of the base body opposite to the catch joint. The locking arrangement is preferably a catch connection consisting of teeth and at least one catch nose. The teeth preferably extend along the arm.

The size of the fastening space can be varied according to the catch position in that an appropriately orientated catch connection is provided in the catch joint and also at the opposite end of the closure member. Owing to the catch joint connecting the base body and the closure member, the fastening device represents a unit of two parts which cannot be separated from one another.

It is preferable to provide, in the fastening space, fixing arrangements with which the position of a rod-shaped article to be fastened can be established within the fastening space. The fixing arrangements are preferably a plurality of flexible stirrups or planks shaped on the interior of the U-shaped base body and on the side of the beam-shaped closure member facing the interior of the base body. The number and orientation of stirrups is selected according to the number of articles to be fastened. It is preferable to provide two respective stirrups in the form of a V on the bottom of the U-shaped base body and on the closure member. The fixing arrangements simultaneously serve to centre the articles to be fastened.

The teeth in the catch joint preferably have a different, preferably coarser pitch than the teeth in the opposite arm of the base body. It is particularly preferable to adapt the teeth in the catch joint to predetermined diameters of the articles to be fastened. The catch pitch in the catch joint is preferably smaller than the catch pitch in the opposite catch connection. However, this also ensures that when the closure member is pressed onto the arms of the base body, the teeth firstly catch in the catch joint and then the teeth in the opposite catch connection.

It is particularly preferable to produce the fastening device by plastics injection molding. It is preferable, in particular, to inject the device in one shot (one shot process). The particular advantage of this process is that the device can be produced as a unit in a single production stage.

A device of this type can be used particularly advantageously in vehicle construction for fastening tube-like conduit elements on a vehicle structure. Weld studs are frequently used to connect the base body to the structure. Therefore, a weld stud receiver is preferably provided in the base body of the fastening device according to the invention. Further intermediate elements such as damping elements can be provided between the fastening device and the structure.

Other advantages, features and possible uses of the present invention will emerge from the following description of embodiments in conjunction with the drawings.

BRIEF DESCRIPTION OF THE DRAWINGS

FIG. 1a shows an embodiment of a fastening device according to this invention in plan view and prior to installation;

FIG. 1b shows the embodiment of FIG. 1a in side elevation;

FIGS. 1a and 1b show an embodiment of the fastening device according to the invention. FIG. 1a shows the device in a plan view and FIG. 1b shows the device in a side view.

DESCRIPTION OF THE PREFERRED EMBODIMENT

Figure 2A:
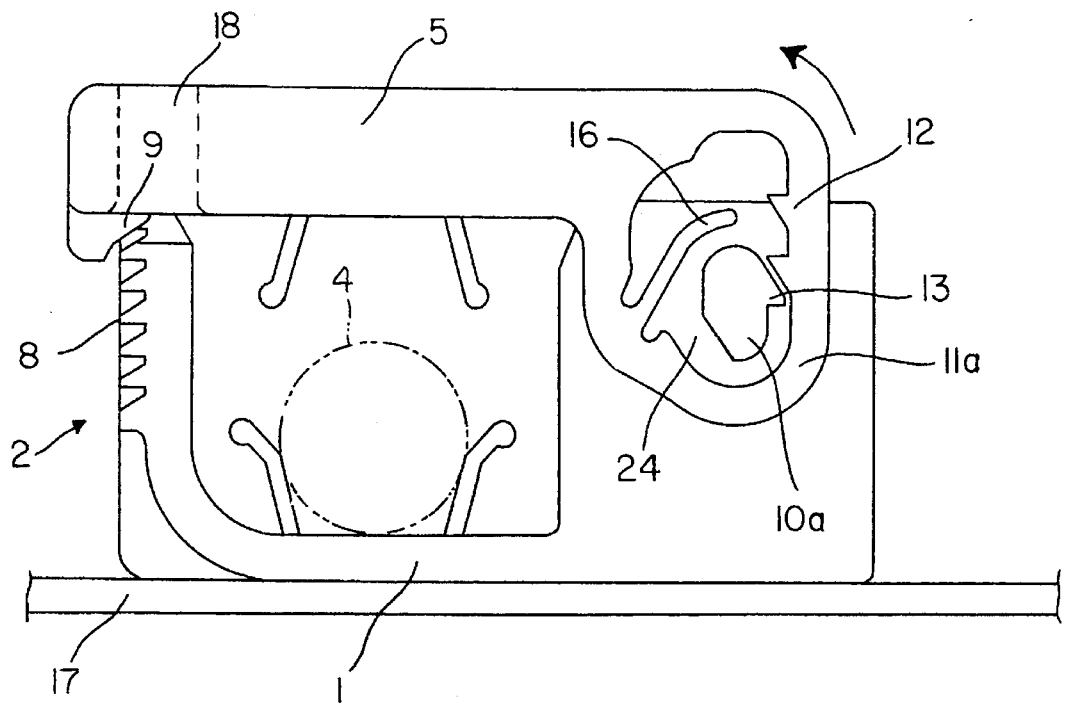
FIGS. 2a and 2b are side elevation views of a fastening device according to this invention showing successive stages in the installation of a small diameter rod-shaped article.

Unless otherwise specified, the following description relates both to FIG. 1a and to FIG. 1b.

FIGS. 1a and 1b shows a U-shaped base body 1 to which a beam-shaped closure member 5 is articulated. The base body 1 has a first arm region 2 and a second arm region 3 with which a space for receiving a rod-shaped article 4 is established. On the second arm region 3 of the base body 1, the beam-shaped closure member 5 is articulated at one end thereof via a hinge-like joint. The joint permits the closure member 5 to be pivoted through about 180° relative to the base body 1 so that the end of the closure member 5 opposite the joint can come into engagement with the first arm region of the base body. FIGS. 1a and 1b shows the device in its open state in which the space provided for receiving the rod-shaped article 4 is accessible from the open side of the U-shaped base body 1. This space is closed from four sides by pivoting the closure member 5, as described above, so that the rod-shaped article 4 is held by the fastening device.

The hinge-like joint is formed from two joint pins 10a, 10b shaped laterally on the second arm region 3 of the base body 1. With these joint pins 10a, 10b there engage joint lugs 11a, 11b which are shaped in the form of forks at one end of the closure member 5, the joint region 7 thereof. The joint lugs 11a, 11b each form a joint eyelet 24 within which the joint pins 10a, 10b can move. Teeth 12 which penetrate into the joint eyelet 24 are shaped on a substantially straight portion of the lug on the internal wall of the joint lugs 11a, 11b. The joint pins 10a, 10b have a substantially elongate shape in cross section. On an elongate portion of the joint pins 10a, 10b there is shaped a respective catch nose 13 which can be brought into engagement with the teeth 12 penetrating into the joint eyelet 24 when the closure member 5 is pivoted into its closure position. An elongate positioning stirrup 16 also penetrates into the joint eyelet 24. The positioning stirrup 16 is flexible; it penetrates sufficiently far into the joint eyelet 24 for the hinge pins 10a, 10b not to be able to adopt any desired portion within the joint eyelet 24. Rather, the joint eyelet 24 is divided by the positioning stirrup 16 for the joint pins 10a, 10b.

Teeth 8 are provided on the exterior of the first arm region 2 of the base body 1. These teeth 8 can be brought into engagement with a catch nose 9 shaped on the closure member 5 in the end region 6 opposite the joint region 7 when the closure member 5 is located in its closure position. For this purpose, the end region 6 of the closure member 5 has a passage 18 of which the cross section is adapted to the cross section of the first arm region 2 of the base body 1. When the closure member 5 is located in its closure position with respect to the base body 1, the first arm region 2 is positioned relative to the passage 18 in such a way that the first arm region 2 can be inserted into the passage 18. The free end of the first arm region 2 is tapered for easier insertion. The passage 18 is tapered at one orifice end with a catch nose 9 of which the cross sectional shape is adapted to the teeth 8 of the first arm region 2. When the closure member 5 is brought into its closure position and the first arm region 2 is inserted into the passage 18, the catch nose 9 and the teeth 8 engage with one another so as to form a catch connection between the end region 6 of the closure member 5 and the first arm region 2 of the base body 1. This catch connection is secured against reciprocal lateral displacement of closure member 5 and base body 1 in that the catch nose 9 is interrupted in the end region 6 by a groove 19 which engages with a rib-like spring 20 in the region of the teeth 8 of the first arm region 2 when the first arm region 2 is inserted into the passage 18.

A weld stud receiver 14 designed as a passage is provided in the second arm region 3 of the base body 1 (see FIG. 1a). The fastening device according to the invention can therefore be fastened, for example, to a weld stud arranged on a structure. However, the arrangement for connecting the base body 1 to a structure is not restricted to weld studs, and other methods of connection known from the prior art may be employed. The particularly preferred embodiment illustrated is provided for fastening to a weld stud as is normal, in particular in vehicle construction. The weld stud receiver 14 has a substantially circular cylindrical cross section in which there penetrate centering ribs 21 and catch finger 22 which are distributed uniformly over the peripheral cross section in each case. In the embodiment illustrated, three centering ribs 21 and three catch fingers 22 are provided in each case. Owing to the centering ribs 21, the weld stud receiver 14 is centered relative to the weld stud during application, and the catch fingers 22 cause the fastening device to catch on teeth encircling the external surface of the weld stud.

Two lower fixing stirrups 15a which penetrate into the space for the rod-shaped article 4 are shaped on the bottom of the U-shaped base body 1. They are spaced sufficiently far from one another and are flexible in each case so that articles 4 having different diameters can be received. The lower fixing stirrups 15a in the base body 1 simultaneously service as a centering aid for the rod-shaped article 4. For this purpose, they are arranged in the form of a V relative to one another, the "V" having a larger angle of aperture in the region of the ends of the lower fixing stirrup 15a. The ends of the lower fixing stirrup 15a are thickened so that larger radii of curvature are formed and therefore the rod-shaped article 4 cannot tilt during insertion between the lower fixing stirrups 15a. Upper fixing stirrups 15b which are similarly arranged in the form of a V are shaped in a central region of the closure member 5. The upper fixing stirrups 15b, like the lower fixing stirrups 15a, each have thickened regions at their ends. However, the upper fixing stirrups 15b do not have an enlarged angle of aperture in their free end region as the function of centering the rod-shaped article 4 is fulfilled by the lower fixing stirrups 15a. Reinforcing ribs 23 which counteract excessive bending of the beam-shaped closure member 5 when it is located in its closed state are also provided in the central region of the beam-shaped closure member 5.

Figure 2B:
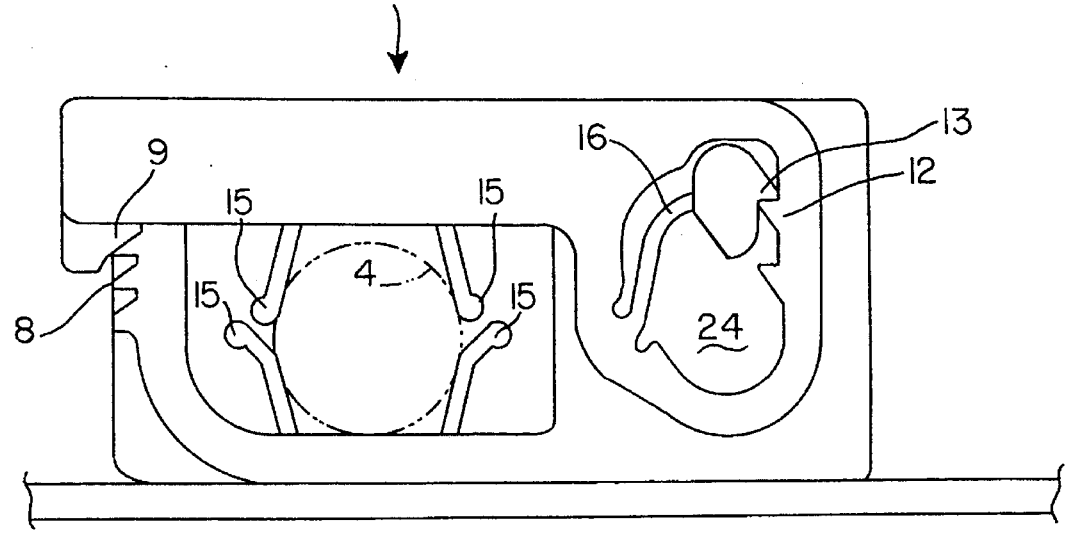

FIGS. 2a and 2b show the installation process for a rod-shaped article 4. As in FIG. 1b, the device is shown in a side view in each case. Starting from the position illustrated in FIG. 1b, the closure member 5 is pivoted through about 180° toward its closed position (indicated by the arrow in FIG. 2a). FIG. 2a shows the device after the closure member 5 has been pivoted. In this state, the end of the first arm region 2 is located at the mouth of the passage 18. The joint pin 10a (and accordingly the joint pin 10b not shown in the plane of the drawing) is located within the joint eyelet 24 in such a position that the catch nose 13 shaped on the joint pin 10a enters the region of engagement of the teeth 12 shaped on the internal wall of a substantially straight region of the joint lug 11a (and accordingly of the joint lug 11b not shown in the plane of the drawing). Similarly, the catch nose 9 is located in the end region 6 of the closure member 5 in a region of engagement of the teeth 8 in the first arm region 2 of the base body 1. FIGS. 2a and 2b also show that the fastening device is arranged on a structure 17. The weld stud suitable for this particularly preferred device is not illustrated. Since pressure is now exerted substantially vertically on the beam-shaped closure member 5 (illustrated by arrow in FIG. 2b), the catch nose 9 catches in the end region 6 and the catch nose 13 on the hinge pin 10a in succession in different positions of the teeth 8 in the first arm region 2 or the teeth 12 in the joint eyelet 24. This is continued until the closure member 5 and the bottom of the base body 1 are as close together as possible so that the rod-shaped article 4 is held securely. The fixing stirrups 15a, 15b fix the rod-shaped article 4 the space which is now closed on four sides. The teeth 8 and the catch nose 9 or the teeth 12 and the catch nose 13 are oriented in each case such that they hold one another in the catch position attained. Therefore, the connection can only be released by pressing the arm regions 2, 3 of the base body toward one another. The positioning stirrup 16 in the joint eyelet 24 ensures that the catch nose 13 of the joint pin 10a is located at a starting position of the teeth 12 before the beginning of the engagement movement. In this way it is possible to ensure that the catch nose 13 is not located behind a tooth of the teeth 12 before the engagement movement and the risk of canted engagement would therefore arise.

Figure 3A:
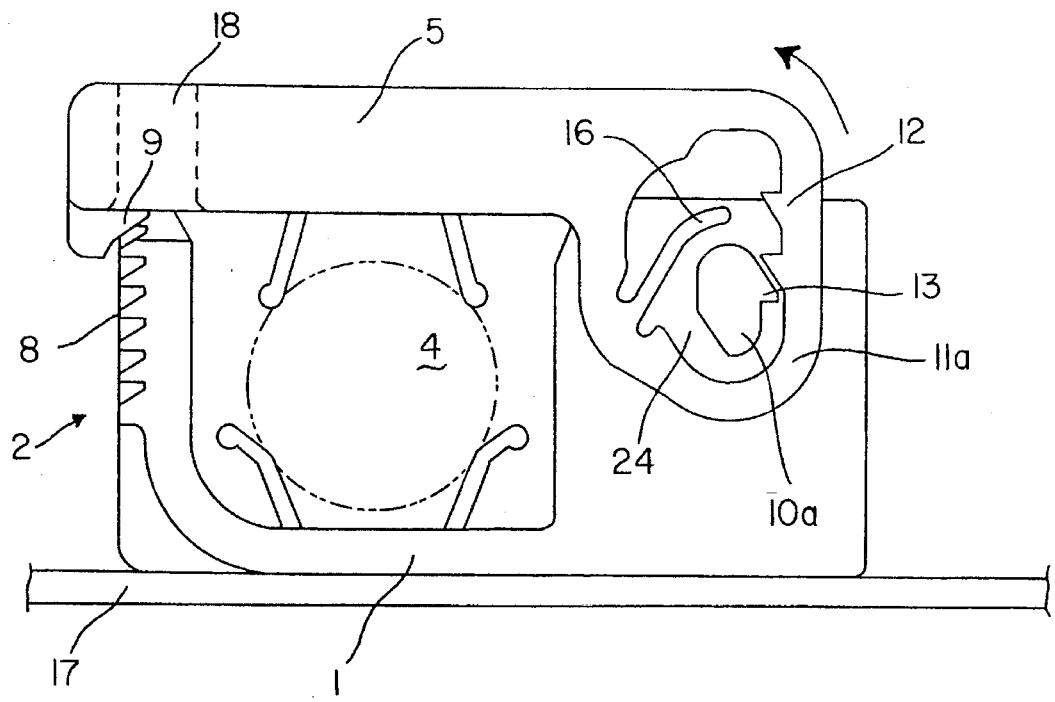
FIGS. 3a and 3b are views corresponding to FIGS. 2a and 2b but showing the installation of a large diameter rod-shaped article.
Figure 3B:
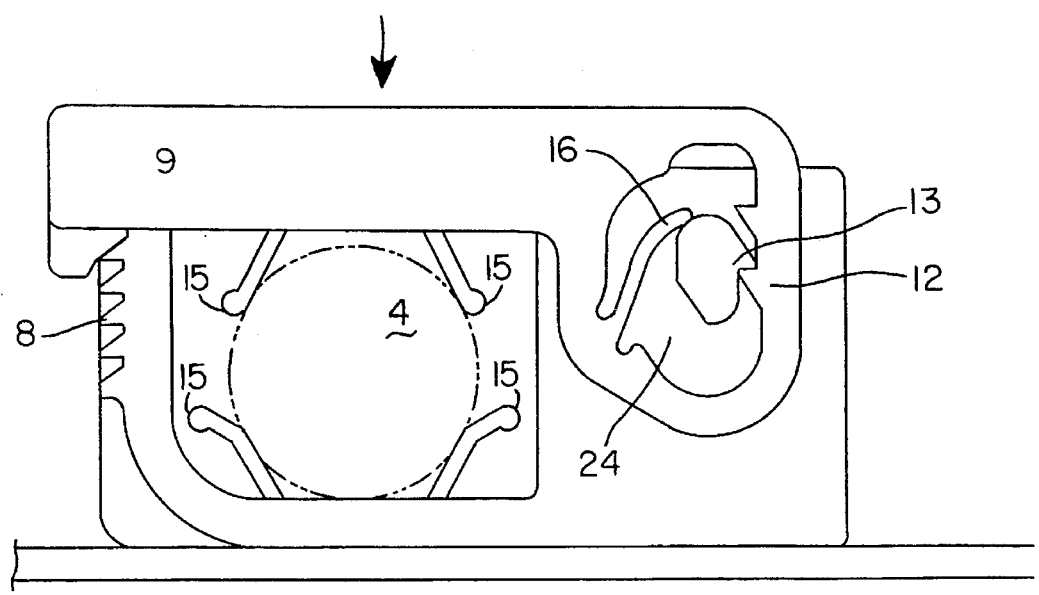

FIGS. 2a and 2b show a rod-shaped article 4 with the smallest possible diameter. In the preferred embodiment, this is 6 mm. FIGS. 3a and 3b show an assembly process for a rod-shaped article 4 with a greater diameter, 8 mm in the example illustrated. The assembly process is basically the same. Owing to the greater diameter of the rod-shaped article 4, however, the engagement position of the closure member 5 relative to the base body 1 is not so deep. In the embodiment illustrated, the teeth 12 in the joint eyelet 24 comprise two teeth and therefore two catch positions. The distance between the two teeth of the teeth 12 corresponds substantially to the difference in diameter between a rod article 4 which is to be fastened and is as small as possible and a rod article 4 which is to be fastened and is as great as possible. The pitch of the teeth 8 in the first arm region 2 of the base body 1 is finer than the pitch of the teeth 12 in the joint eyelet 24. A plurality of catch positions can be adopted allowing rod-shaped articles 4 of which the diameter lies between the smallest possible and the greatest possible diameter to be fastened with the device. If the rod-shaped article 4 has an intermediate diameter, the closure member 5 can be inclined relative to the bottom of the base body 1. The teeth 8 and 12 are adapted to one another such that when rod-shaped articles 4 having two diameters corresponding to the pitch of the teeth 12 are fastened, the closure member 5 comes to rest in parallel with the bottom of the base body 1. Articles rod-shaped 4 having different diameters are still fixed in the fastening space by the resilient fixing stirrups 15.

The fastening device according to the invention is preferably produced by the injection molding of plastics. It is particularly preferable to produce the device by a one-shot process during which the base body 1 and the closure member 5 are formed in a single molding process, the two parts not having to be assembled. The hinge-like joint between the base body 1 and the closure member 5 is in fact formed during the actual molding process. With the one-shot process, a certain minimum distance has to be maintained at each point between the two parts during molding. This is revealed, for example, in that the orifice in the fork formed by the joint lugs 11a, 11b is wider by a predetermined amount than the second arm region 3 of the base body 1 (see FIG. 1a). The catch joint therefore has play in the direction of the joint axis. However, the joint pins are sufficiently long in size for the joint to be released.

Similarly, there is also a predetermined minimum distance at each point between the joint pins 10a, 10b and the joint lugs 11a, 11b (see FIG. 1b). The one-shot process has the advantage that the joint pins 10a, 10b of the base body 1 and the joint lugs 11a, 11b of the closure member 5 do not have to be inserted in one another after production of the individual parts. This represents a considerable economic advantage during the mass production of such devices.

The device can be used directly for the assembly of rod-shaped articles 4 of the type removed from an injection molding device. The device can therefore be provided as a unit. As illustrated, it is suitable for rod-shaped articles 4 of different diameters. This device is preferably connected to a structure 17 by means of a weld stud receiver 14, but the fastening device itself can also be provided with a stud which is inserted into a hole in the structure 17. Other methods of connection such as screws, adhesion or rivets are obviously also possible.

The invention claimed is:

1. A fastening device capable of holding rod-shaped articles of different diameters, the fastening device comprising a base body;

a closure member articulated thereto, said closure member being movable between an open and a closed position on said base body;

a hinge joint connecting said base body and said closure member, said joint including a joint pin and a joint lug, said joint pin and said joint lug together forming a joint eyelet;

one of said joint pin and said joint lug having an internal wall, said internal wall having a first set of teeth thereon, and the other of said joint pin and said joint lug having a first catch nose, said first catch nose being engageable with said first set of teeth when said closure member is in said closed position.

2. A fastening device as claimed in claim 1 wherein said base body is generally U-shaped for receiving at least one rod-shaped article, and includes first and second arm regions; said closure member is generally beam-shaped and includes first and second end regions, said first arm region and said first end region being connectable by engagement of a second set of teeth and a second catch nose for retaining said closure member in said closed position.

3. A fastening device according to claim 2 wherein said hinge pins (10a, 10b) are shaped in said second arm region (3) of said base body (1) and said hinge lugs (11a, 11b) are shaped in the form of a fork in said second end region (7) of said closure member (5).

4. A fastening device according to claim 2, characterized in that said first set of teeth (12) are spaced to accommodate predetermined diameters of the article (4).

5. A fastening device according to claim 2, characterized in that the pitch of said second set of teeth (8) is greater than the pitch of said first set of teeth (12).

6. A fastening device according to claim 2, characterized in that said first and said second sets of teeth extend sufficiently to accommodate articles having diameters in the range of 5 to 10 mm.

7. A fastening device according to claim 1, characterized in that a resilient positioning stirrup is formed in said joint eyelet (24).

8. A fastening device according to claim 1 and further comprising lower fixing stirrups (15a) and upper fixing stirrups (15b) with which an article can be fixed in the fastening device, said lower fixing stirrups and said upper fixing stirrups being formed in said base body (1) and on said closure member (5) respectively.

9. A fastening device according to claim 1, characterized in that said base body (1) has a connecting arrangement for connection to a supporting structure (17).

10. A fastening device according to claim 9, characterized in that said connecting arrangement comprises a passage (14) said passage having centering ribs (21) and catch fingers (22) for engaging a weld stud.

11. A fastening device according to claim 1, characterized in that the device consists of plastic injection moldings.

12. A fastening device according to claim 1, characterized in that the device is injection molded in one step in its assembled form.

* * * * *